(12) United States Patent
Omori et al.

(10) Patent No.: US 8,615,627 B2
(45) Date of Patent: Dec. 24, 2013

(54) RAID SYSTEM BASED ON CALCULATED AVERAGE OF MECHANICAL LOADS AND SOLDER JOINT DAMAGE AND CONTROLLING METHOD OF THE SAME

(75) Inventors: Takahiro Omori, Kanagawa-ken (JP); Minoru Mukai, Tokyo (JP); Kenji Hirohata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 13/181,651

(22) Filed: Jul. 13, 2011

(65) Prior Publication Data

US 2011/0271052 A1    Nov. 3, 2011

Related U.S. Application Data

(63) Continuation of application No. PCT/JP2010/000084, filed on Jan. 8, 2010.

(30) Foreign Application Priority Data

Jan. 23, 2009  (JP) ................................ 2009-013226

(51) Int. Cl.
*G06F 12/16* (2006.01)
(52) U.S. Cl.
USPC .................... 711/114; 711/103; 711/E12.008
(58) Field of Classification Search
USPC ................................... 711/103, 114, E12.008
See application file for complete search history.

(56) References Cited

U.S. PATENT DOCUMENTS

| | | | | |
|---|---|---|---|---|
| 5,900,007 | A | * | 5/1999 | Nunnelley et al. ................. 711/4 |
| 6,401,214 | B1 | * | 6/2002 | Li .................................... 714/6.3 |
| 2008/0249743 | A1 | * | 10/2008 | Hirohata et al. ................ 702/181 |
| 2008/0276038 | A1 | * | 11/2008 | Tanaka et al. .................. 711/103 |
| 2010/0017649 | A1 | * | 1/2010 | Wu et al. ............................ 714/6 |
| 2010/0070204 | A1 | | 3/2010 | Monda et al. |

FOREIGN PATENT DOCUMENTS

| | | |
|---|---|---|
| JP | 2004-240669 | 8/2004 |
| JP | 2005-174203 | 6/2005 |
| JP | 2007-102533 | 4/2007 |
| JP | 2007-265265 | 10/2007 |
| JP | 2008-112452 | 5/2008 |

OTHER PUBLICATIONS

"Multi-Chip Memory Module with Flip-Chip-On-Chip Structure and Optional Center Via Hole for Underfill Dispensing," S.W. Ricky Lee et al., 2003 Electronic Components and Technology Conference, IEEE, 2003.*
International Preliminary Report on Patentability for International Application No. PCT/JP2010/000084 issued on Jul. 26, 2011.
Japanese Office Action for application No. 2009-013226 filed on Jan. 23, 2009.

* cited by examiner

*Primary Examiner* — Hal Schnee
(74) *Attorney, Agent, or Firm* — Turocy & Watson, LLP

(57) ABSTRACT

A RAID system to transfer data to and from host equipment includes a semiconductor storage unit, a semiconductor-memory selector, and a memory controller. The semiconductor storage unit includes two or more semiconductor memories, a mounting board, and solder joints. The semiconductor memories are mounted on the mounting board. The solder joints are between the semiconductor memories and the mounting board. The semiconductor-memory selector selects a combination of the semiconductor memories to dispersively record the data in the semiconductor storage unit. The memory controller accesses the combination in response to a request of the host equipment. In addition, the selector selects the combination so that mechanical loads received by the semiconductor memories are averaged.

18 Claims, 11 Drawing Sheets

RAID SYSTEM BASED ON CALCULATED AVERAGE OF MECHANICAL LOADS AND SOLDER JOINT DAMAGE AND CONTROLLING METHOD OF THE SAME

CROSS REFERENCE TO RELATED APPLICATION

This is a Continuation Application of PCT Application No. PCT/JP2010/000084, filed on Jan. 8, 2010, and is based upon and claims the benefit of priority from the prior Japanese Patent Application No. 2009-013226, filed on Jan. 23, 2009, all the entire contents of which are incorporated herein by reference.

FIELD

Embodiments relate basically to a RAID system including a semiconductor storage unit, and a control method thereof.

BACKGROUND

In recent years, a RAID (Redundant Array of Inexpensive Disks) using HDDs (Hard Disk Drive) has been widely used as a typical mass-storage system. RAID combines two or more inexpensive HDDs to perform distributive recording of data having redundancy given, thereby enabling a rapid and reliable storage system at low cost.

A magnetic head records data on a ferromagnetic layer of a magnetic disk in a HDD. There may be many factors influential to a life of HDD. HDD has a disk-like storage part which could have defective portions to be randomly distributed on the disk. Therefore, every location for recording data has the same probability of loosing the data. For this reason, trouble or failure could occur equally in all locations on the disk of HDD and does not depend seriously on the locations for recording data. HDDs included in RAID also have no trouble or failure depending on the locations for dispersively recording data inside the HDDs.

On the other hand, a semiconductor storage unit using semiconductor nonvolatile memories is developing rapidly. The semiconductor storage unit stores data in the semiconductor memories mounted on a mounting board. Unlike the disk of HDD, the semiconductor memories are not necessarily mounted on the substrate with physical symmetry. Therefore, a difference arises in the probability of defects in association with the physical locations of the semiconductor memories on the mounting board. For this reason, it is not enough to simply give redundancy to data for dispersive recording in consideration of a recovery of the data.

Moreover, semiconductor memories have limits of writing frequencies thereof. The limits demand devised equalization of erasing frequencies over the semiconductor memories. For example, it is disclosed that RAID includes two or more flash-memory modules of which erasing frequencies are equalized over the modules. This enables it to extend a service life of the storage system including RAID by the equalization of erasing-frequency over two or more modules included in RAID in order to avoid the erasing-frequency limit peculiar to a semiconductor memory.

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

DESCRIPTION

Figure 1:
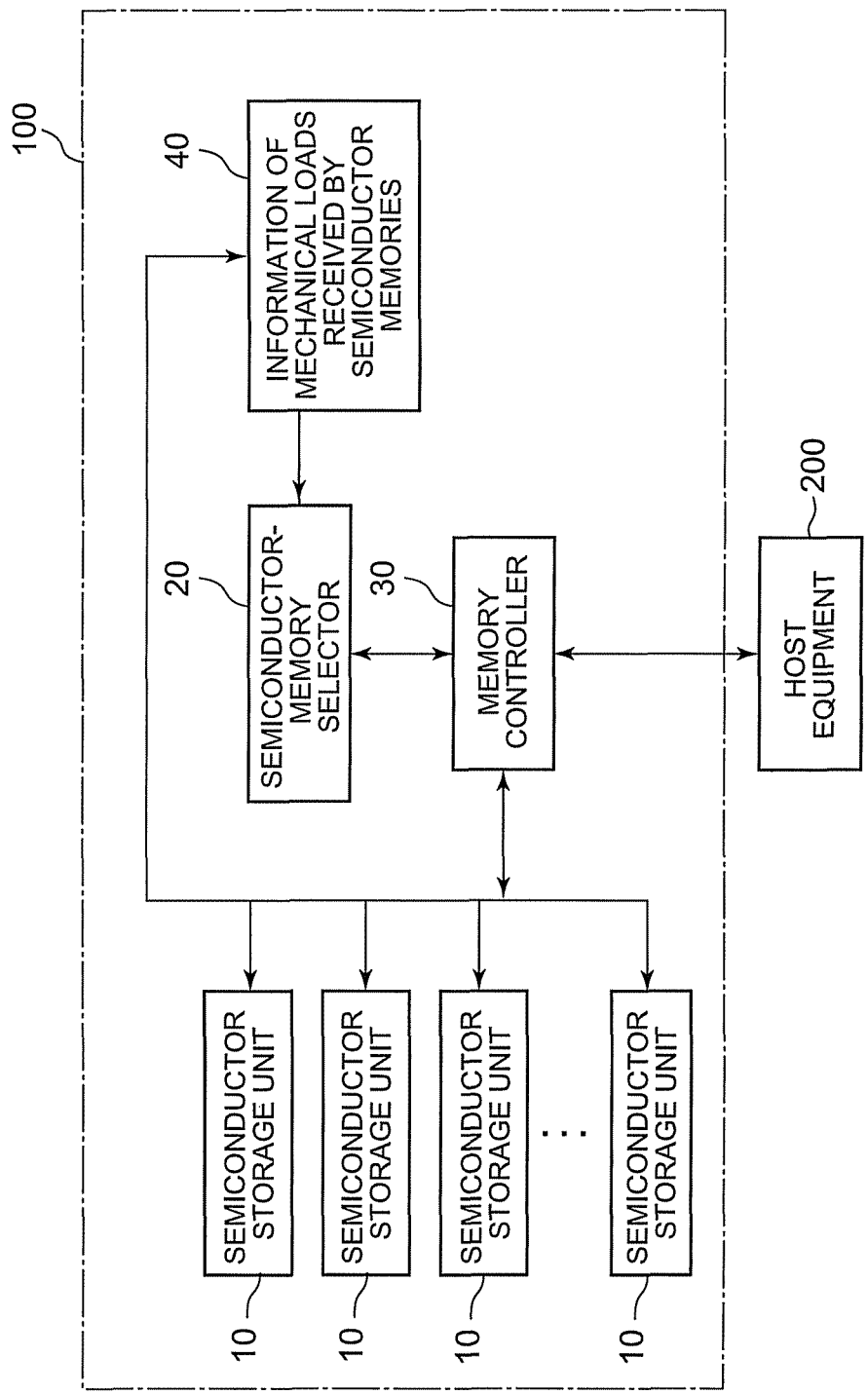
FIG. 1 is a block diagram showing a configuration of a RAID system using semiconductor storage units in accordance with a first embodiment.

As will be described below, according to an embodiment, a RAID system to transfer data to and from host equipment includes a semiconductor storage unit, a semiconductor-memory selector, and a memory controller. The semiconductor storage unit includes two or more semiconductor memories, a mounting board, and solder joints. The semiconductor memories are mounted on the mounting board. The solder joints are between the semiconductor memories and the mounting board. The semiconductor-memory selector selects a combination of the semiconductor memories to dispersively record the data in the semiconductor storage unit. The memory controller accesses the combination in response to a request of the host equipment. In addition, the selector selects the combination so that mechanical loads received by the semiconductor memories are averaged.

According to another embodiment, a RAID system to transfer data to and from host equipment includes a semiconductor storage unit, a semiconductor-memory selector, and a memory controller. The semiconductor storage unit includes two or more semiconductor memories, a mounting board, and solder joints. The semiconductor memories are mounted on the mounting board. The solder joints are between the semiconductor memories and the mounting board. The semiconductor-memory selector selects a combination of the semiconductor memories to dispersively record the data in the semiconductor storage unit. The memory controller accesses the combination in response to a request of the host equipment. In addition, the selector selects the combination so that damage indexes of the solder joints are averaged.

According to another embodiment, a RAID system to transfer data to and from host equipment includes a semiconductor storage unit, a semiconductor-memory selector, and a memory controller. The semiconductor storage unit includes two or more semiconductor memories, a mounting board, and solder joints. The semiconductor memories are mounted on the mounting board. The solder joints are between the semiconductor memories and the mounting board. The semiconductor-memory selector selects a combination of the semiconductor memories to dispersively record the data in the semiconductor storage unit. The memory controller accesses the combination in response to a request of the host equipment. In addition, the selector selects the combination so that damage indexes of the solder joints are averaged and the number of writing operations to the semiconductor memories is averaged.

The embodiments will be described below with reference to drawings. Wherever possible, the same reference numerals or marks will be used to denote the same or like portions throughout figures, and overlapping explanations are not repeated in the embodiments.

First Embodiment

FIG. 1 is a block diagram showing a configuration of a RAID system using semiconductor storage units in accordance with a first embodiment. The RAID system 100 includes two or more semiconductor storage units 10, a memory controller 30, and a semiconductor-memory selector 20 to be connected to external host equipment. As will be mentioned later, the semiconductor storage unit 10 mounts two or more semiconductor memories on a mounting board thereof. The semiconductor-memory selector 20 selects a combination of the semiconductor memories to dispersively store data in the semiconductor storage units 10. The semiconductor-memory selector 20 selects the combination so that mechanical loads received by the semiconductor memories are averaged out in each semiconductor storage unit 10. In the first embodiment, the semiconductor-memory selector 20 loads information 40 of the mechanical loads which the semiconductor memories receive. The memory controller 30 accesses the semiconductor memory selected by the semiconductor-memory selector 20 in response to a request of the host equipment, e.g., to dispersively record data. An electronic device, e.g., a personal computer is employed for the host equipment 200.

Figure 2:
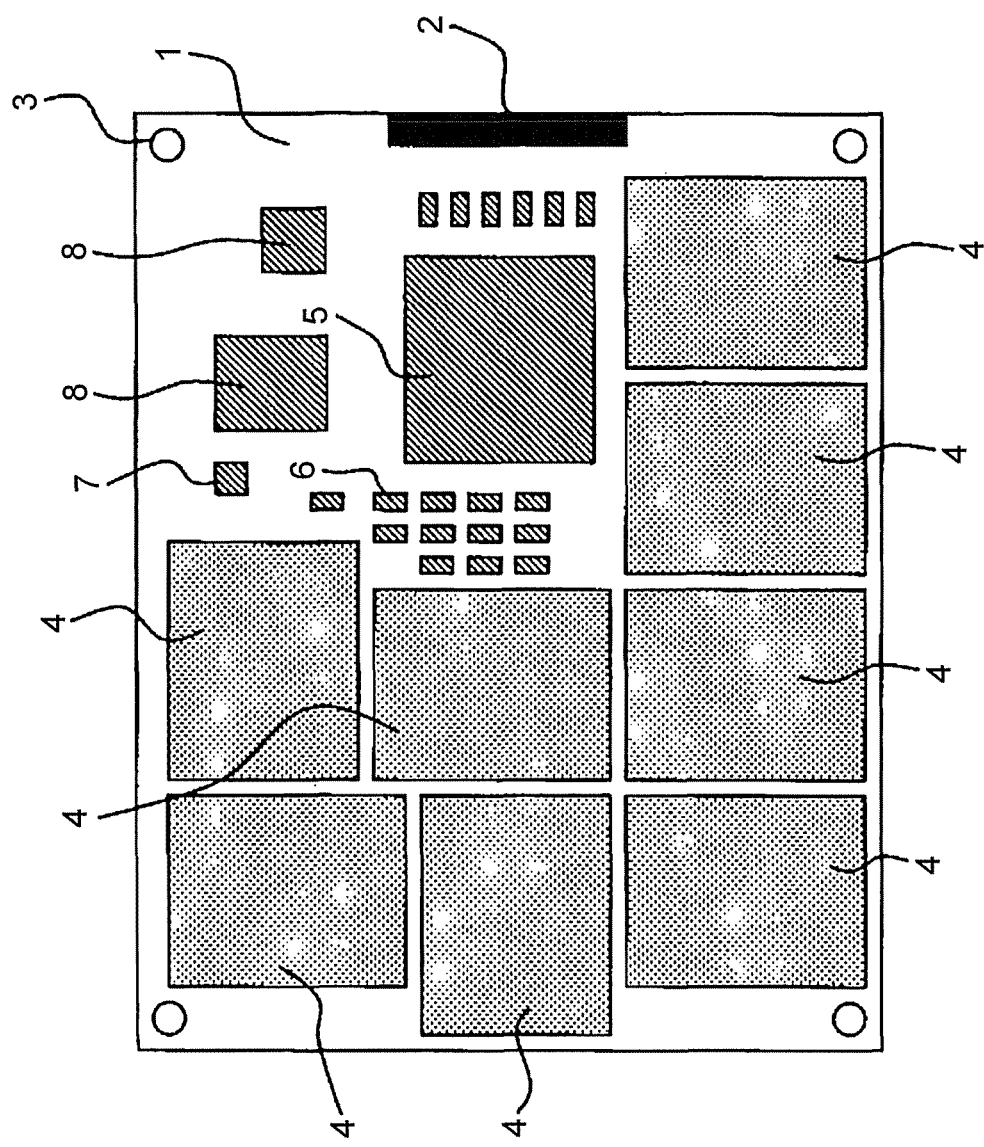
FIG. 2 is a schematic diagram showing a rough configuration of the semiconductor storage unit in accordance with the first embodiment.

FIG. 2 is a schematic diagram showing a rough configuration of the semiconductor storage unit 10 in accordance with the first embodiment. In FIG. 2, a control IC 5 is arranged a little to the right side from the center of the mounting board. A capacitor 6, a sensor 7, and a power supply 8 are arranged around the control IC 5. The sensor 7 measures physical variations in an environment on the mounting board or in the ambient environment of the mounting board to be arranged for monitoring. Physical quantities to be measured include acceleration, strain, temperature, resistance, impedance, or two or more of these quantities.

Furthermore, eight semiconductor memories 4 are arranged around the capacitor 6, the control IC 5, and the power supply 8. Therefore, the distances between the control IC 5 and the position of the respective semiconductor memories 4 are different from each other. A binary NAND flash memory or a multivalued NAND flash memory is suitable for the semiconductor memory 4, for example. Although the number of the mounted semiconductor memories 4 is shown to be eight in FIG. 2, the number of the semiconductor memories 4 mounted in one semiconductor storage unit 10 is not necessarily limited to "eight." A connector 2 is arranged at an edge of the mounting board 1. The semiconductor storage unit 10 may be sealed with a resin to be a semiconductor package.

Figure 3:
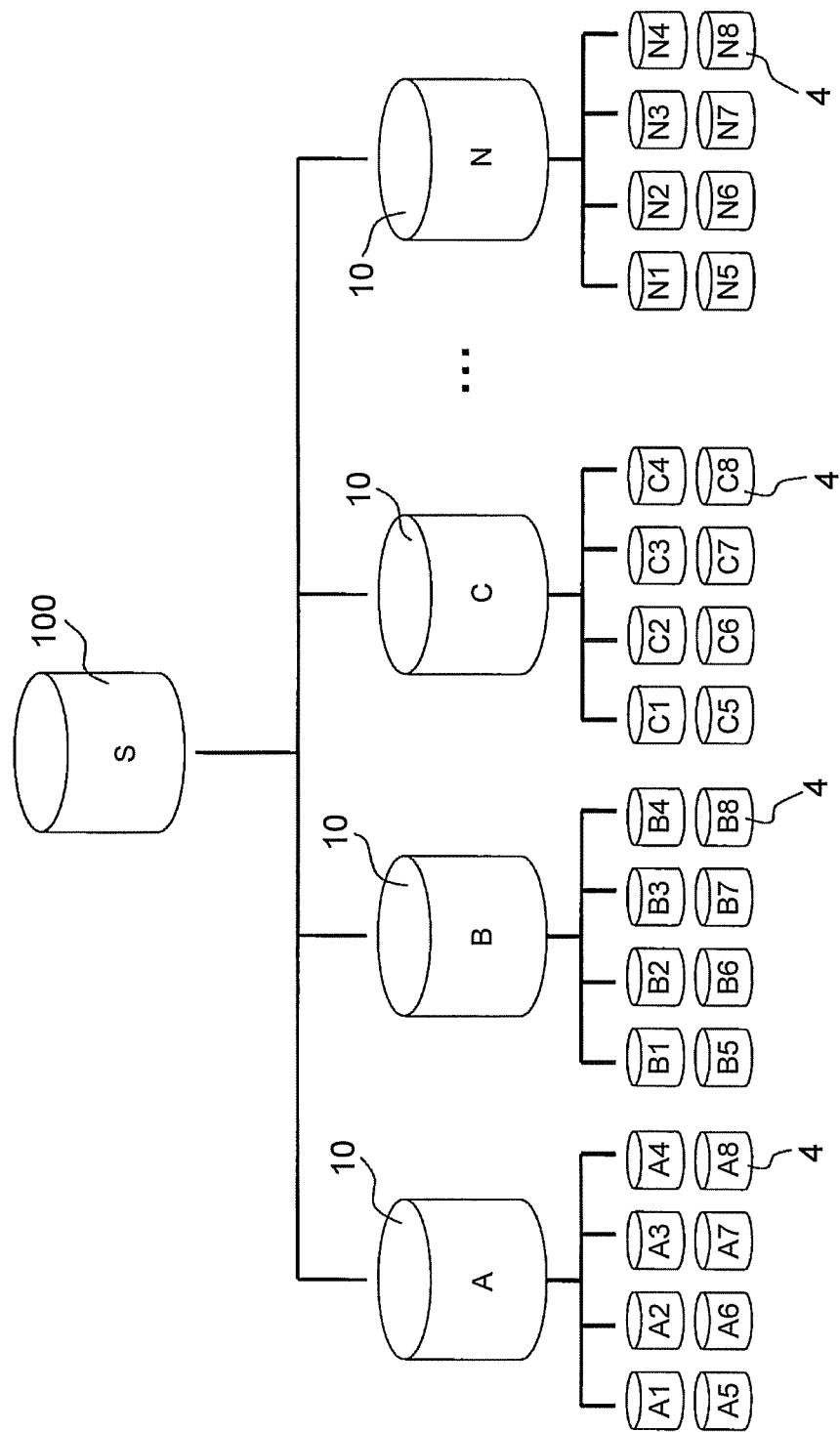
FIG. 3 is a schematic diagram showing an example of the RAID system.

As shown in FIG. 3, the RAID system 100 includes "N" semiconductor storage units 10 shown in FIG. 2. FIG. 3 is a schematic diagram showing an example of the RAID system 100. In the RAID system 100 shown in FIG. 3, a piece of data is distributed to N blocks to be stored in each semiconductor storage unit 10. The method to distribute data is not limited to a specific one and may employ various known methods in accordance with the redundancy level of RAID. The various methods include the followings:

to divide a piece of data into N pieces thereof for saving (RAID 0);

to make n copies of data for saving the N respective copies (RAID 1); and to further store parity of the divided pieces of the data (RAID 5-6).

In the first embodiment, writing to the semiconductor memory 4 will be optimized under a thermal variation (thermal load) due to heating of the control IC 5. The control IC 5 to be used for the semiconductor storage unit 10 secondarily involves generation of much heat. When large thermal variations are involved in the mounted parts on the mounting board 1, a high thermal stress is caused in solder joints connecting the semiconductor memories 4 to the mounting board 1 when switching ON and OFF of a power supply.

In the semiconductor storage unit 10 shown in FIG. 2, the farther from the control IC 5, the lower the temperature on the mounting board 1. Therefore, in each semiconductor storage unit 10 included in the RAID system 100, the combination of the semiconductor memories 4 to which pieces of data are dispersively saved is determined so that the typical distances between the respective semiconductor memories 4 and the control IC 5 are averaged out as much as possible. As a result, the influence of the thermal variation can be averaged out over all the semiconductor memories 4 included in the RAID system 100. As the typical distance, it is preferable to choose a distance between the center of the control IC 5 and the center of each semiconductor memory 4 or a distance between the center of the control IC 5 and the center of a solder joint of each semiconductor memory 4, the solder joint being closest to the center of the control IC 5.

The combination to average out the typical distances can be determined when the semiconductor storage unit 10 is designed. However, it is also possible to continually alter the priority order of the combination by referring to information of degraded semiconductor memories 4, e.g., the number of previously performed writing.

A specific method is to determine the optimal combination of the semiconductor memories 4 using the distances between the respective semiconductor memories 4 and the control IC 5. In the k-th semiconductor storage unit 10, the typical distance between the control IC 5 and each semiconductor memory 4 is assumed to be $d_{ki}$ (k=1 ... n, i=1 ... 8). It is also assumed to combine the semiconductor memories 4 (A1 to A8) of the semiconductor storage unit 10 (A) for saving data. When assuming a set of semiconductor memories of the other semiconductor storage unit as B(i), C(i), ..., Ni) (B(i), C(i), ..., N(i)∈{1 ... 8}, i=1 ... 8), the method to determine the combination results in solving the following optimization problem where min.$f$ means minimizing a function $f$.

[Equation 1]

$$\min \cdot f = \sum_{i=1}^{8} ((d_{1i} + d_{2B(i)} + d_{3C(i)} + \ldots + d_{nN(i)})/n - m)^2 \quad (1)$$

$$m = \sum_{i=1}^{8} (d_{1i} + d_{2B(i)} + d_{3C(i)} + \ldots + d_{nN(i)})/(8 \times n)$$

Figure 4:
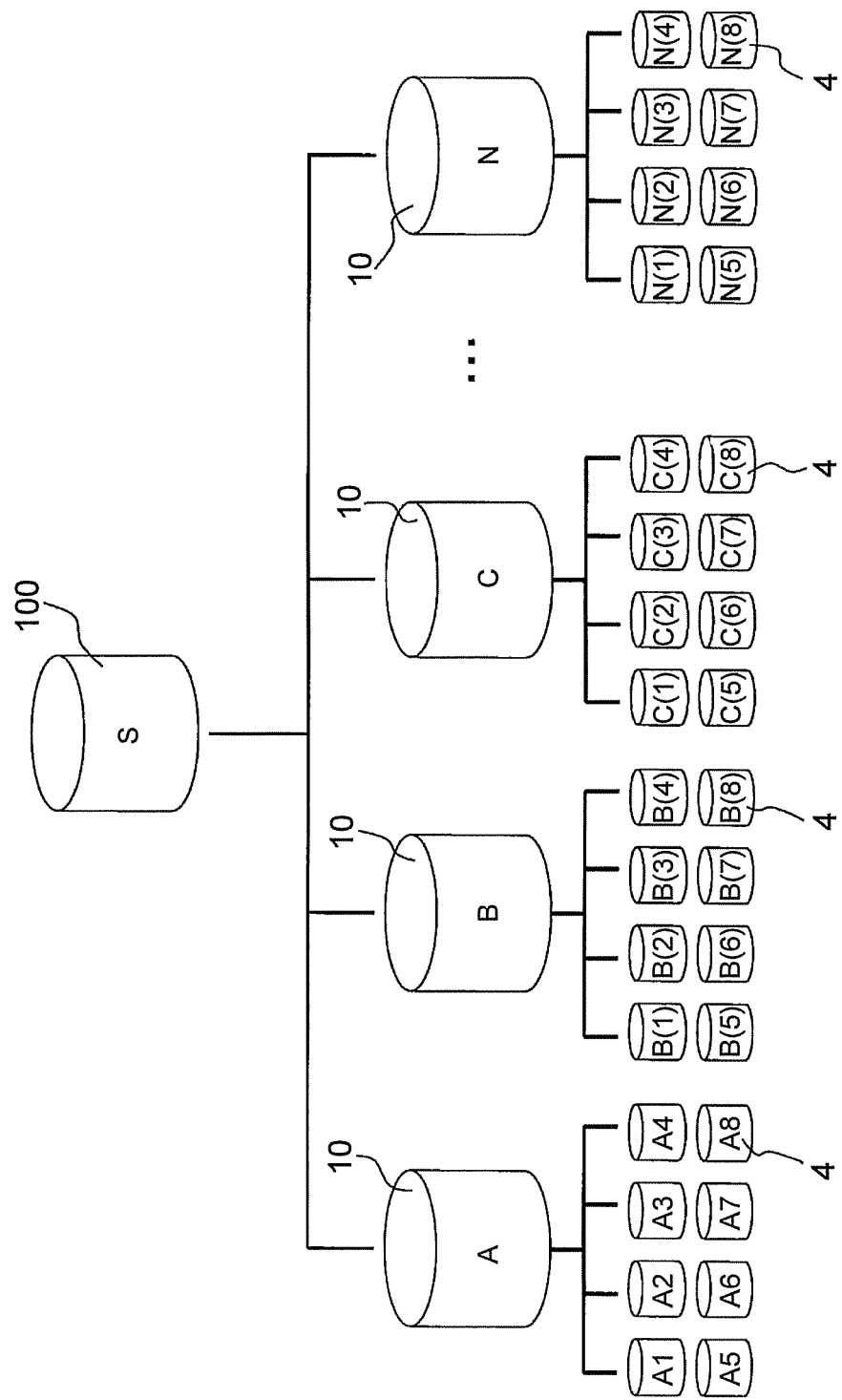
FIG. 4 is a diagram showing an optimized combination of semiconductor memories.
Figure 5:
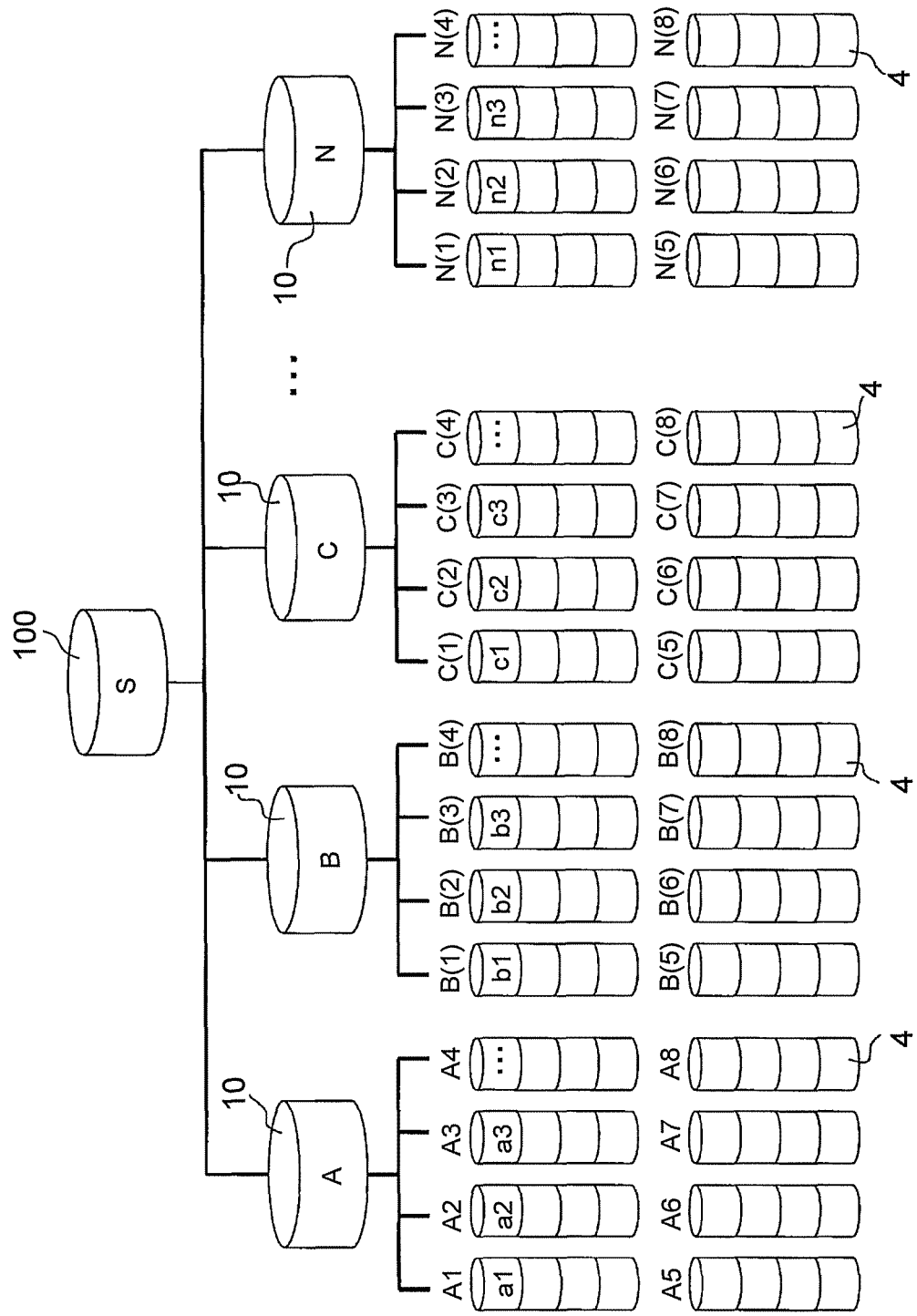
FIG. 5 is a view showing an example to save dispersively data to be recorded.

A general optimization algorithm such as a genetic algorithm can provide a solution of the formula (1). FIG. 4 is a diagram showing an order of the semiconductor memories 4 arranged on the basis of the combination of the semiconductor memories 4 to dispersively record data. As shown in FIG. 4, The RAID system 100 includes N semiconductor storage units 10, each having eight semiconductor memories 4. The semiconductor storage units 10 (B to N) are shown to have the semiconductor memories 4 thereof arranged by the optimization algorithm. Pieces of data are dispersively recorded as shown in FIG. 5 to the optimized combination of the semiconductor memories 4 in FIG. 4. As shown in FIG. 5, when the distributed piece of data a1 is recorded in the semiconductor memory A1, the distributed pieces of data b1 and c1 are recorded in semiconductor memories B (1) and C (1) selected as the combination. The distributed piece of data n1 is recorded in the same way as mentioned above. In accordance with this embodiment, the mechanical load mainly arising from heat which causes mechanical stress due to the discrepancy of CTE (Coefficient of Thermal Expansion) of each part is taken into consideration, thereby allowing it to reduce a risk of data loss.

Second Embodiment

A second embodiment will be described to optimize a writing operation to loads or vibration from the outside. When a load (or vibration) is added to the mounting board 1 provided with supporting portions (boss holes) 3 as shown in FIG. 2, the load is transferred to the mounting board 1 through the supporting portions 3. When the load is applied via the supporting portion 3, a curvature of the mounting board at a point thereon becomes larger as the point thereof approaches the supporting portion 3. The larger the curvature of the mounting board 1, the higher a stress arising at a solder joint between the semiconductor memory 4 and the mounting board 1.

Then, in the second embodiment, data is dispersively saved so that the typical distances from the respective semiconductor memories to the supporting portions 3 are averaged out. It is preferable to select a distance between centers of each semiconductor memory 4 and a supporting portion 3 or a distance between a center of a supporting portion 3 and a solder joint of each semiconductor memory 4 as the typical distance. The typical distances can be assigned to the formula (1) to result in an optimization problem, thereby allowing it to obtain a solution for the combination.

The combination to average out the typical distances can be determined when the semiconductor storage unit 10 is designed. However, it is also possible to continually alter the priority order of the combination by referring to information of degraded semiconductor memories 4, e.g., the number of previously performed writing.

Figure 6:
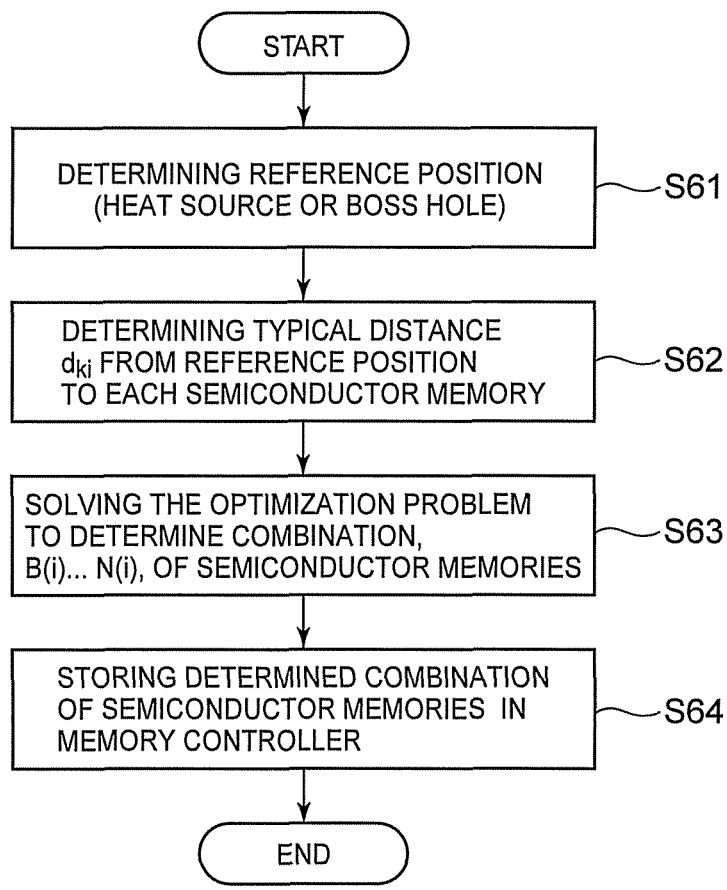
FIG. 6 is a flow chart showing a process to determine a combination of semiconductor memories.

A process flow to determine the combination of the semiconductor memories will be described with reference to FIG. 6, the semiconductor memories mentioned in the first and second embodiments.

Figure 7:
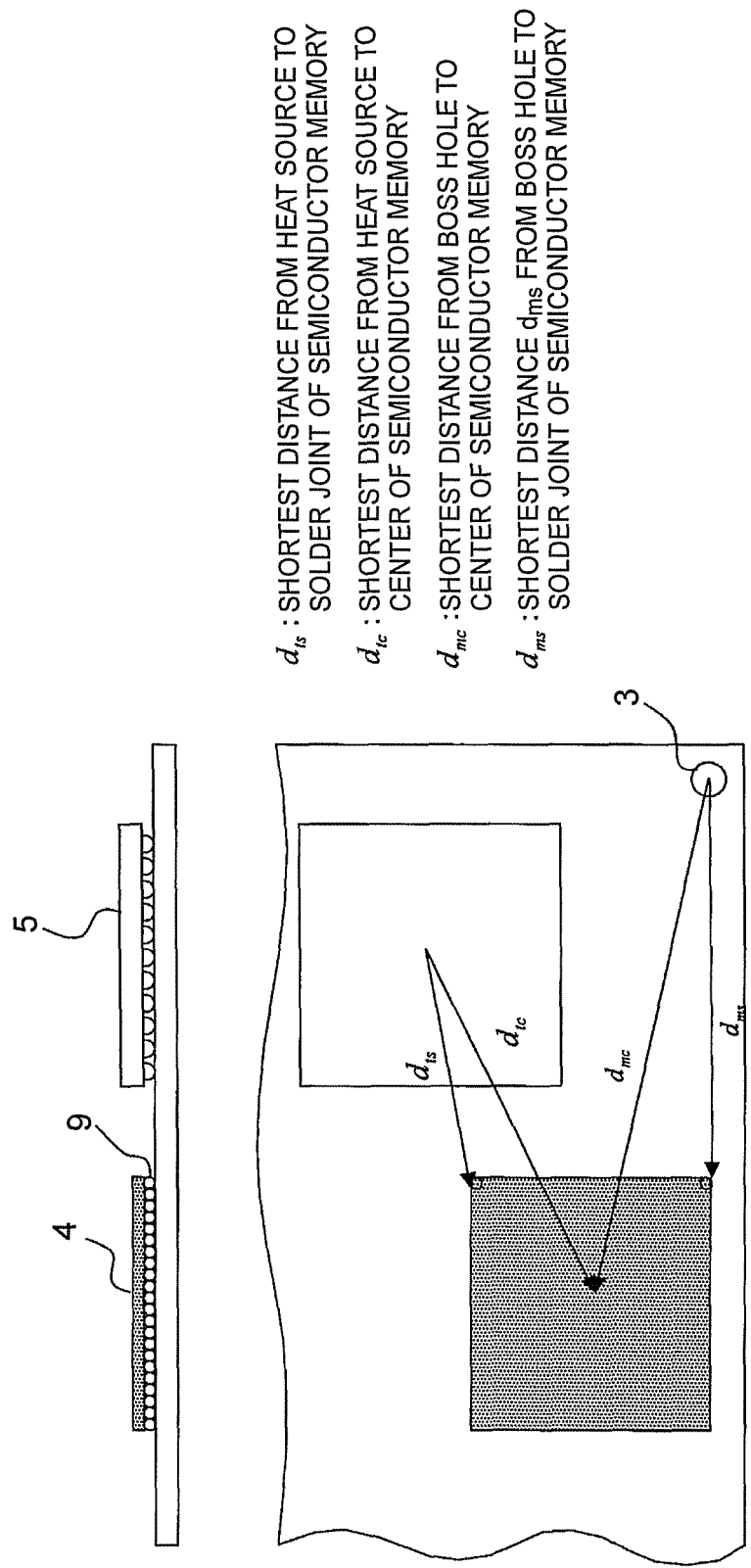
FIG. 7 is a view showing how to determine a typical distance.

First, the position of a heat source or a boss hole is determined as a reference position (Step S61). Here, the heat source is the control IC 5 or the power supply 8, and the boss hole is the supporting portion 3. The typical distance $d_{ki}$ from the heat source to each semiconductor memory 4 is determined (Step S62). How to determine the typical distance $d_{ki}$ is not limited to only one method. Therefore, it is preferable to determine as shown in FIG. 7, for example. FIG. 7 is a view showing how to determine the typical distance. As shown in FIG. 7, either one of the followings may be the typical distance:

the shortest distance $d_{ts}$ from the control IC 5 as a heat source to the solder joint of the semiconductor memory 4;
the shortest distance $d_{tc}$ from the control IC 5 as a heat source to the center of the semiconductor memory 4;
the shortest distance $d_{ms}$ from the boss hole 3 to the solder joint 9 of the semiconductor memory 4; and
the shortest distance $d_{mc}$ from the boss hole 3 to the center of the semiconductor memory 4.

The determination of the typical distance $d_{ki}$ is followed by solving the optimization problem to determine the combination of the semiconductor memories 4 (Step S63). The determined combination of the semiconductor memories 4 is stored in the memory controller 30 provided to the RAID system 100 (Step S64).

Third Embodiment

Figure 8:
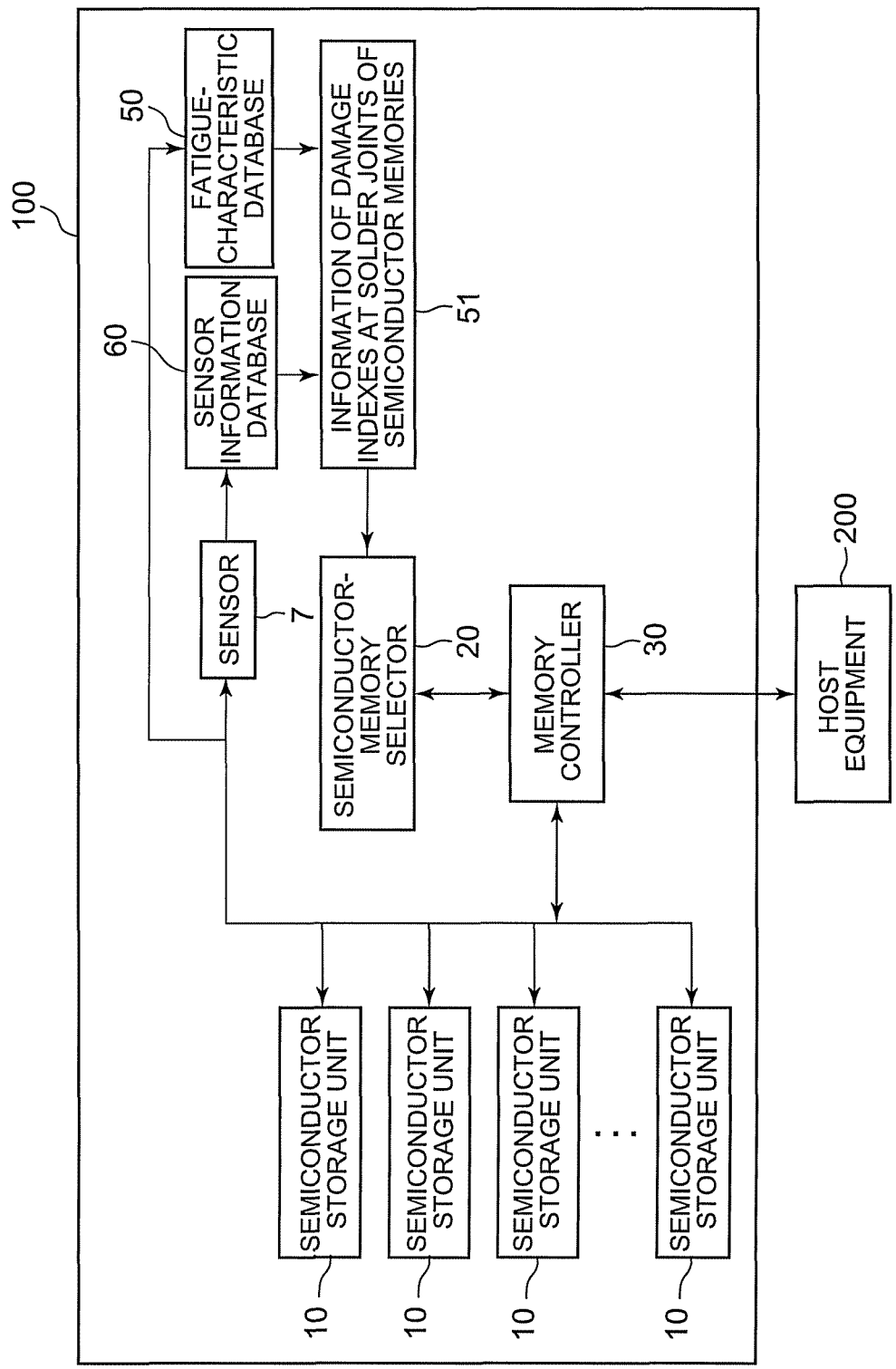
FIG. 8 is a block diagram showing a configuration of a RAID system using the semiconductor storage units in accordance with a third embodiment.

A third embodiment will be described below. The third embodiment estimates a damage index accumulated in the solder joint of each semiconductor memory while measuring physical conditions to optimize the writing operation on the basis of the estimated damage index. FIG. 8 is a block diagram showing a configuration of a RAID system 100 using the semiconductor storage units in accordance with the third embodiment. This RAID system 100 includes two or more semiconductor storage units 10, a memory controller 30, and a semiconductor-memory selector 20 to be connected to external host equipment. Furthermore, in the third embodiment, a fatigue-characteristic database 50 is prepared beforehand. The fatigue-characteristic database 50 accumulates data of a relation between a strain range and a service life of the solder joint 9, for example. The database 50 uses design information of the mounting board 1 and information of materials to be employed to execute phenomenological analysis for the semiconductor storage units 10 including the semiconductor memories 4 and to estimate loads applied to the solder joints 9, thereby allowing it to deduce breaks of the solder joints 9.

As was mentioned in the first and second embodiments, the mechanical loads cause damage to the solder joints 9. Once the damage is accumulated in a solder joint 9 to some extent, the solder joint 9 is disconnected as a result of fatigue. This embodiment measures a physical quantity with the sensor 7 to compare the quantity with the database 50 saved separately, thereby calculating damage indexes of the solder joints 9 of the respective semiconductor memories 4. The semiconductor-memory selector 20 determines a combination of semiconductor memories 4 to write distributed pieces of data therein on the basis of the information 51 of the damage indexes. The combination of the semiconductor memories 4 is updated with each saving of a file, each use for a certain period or each garbage collection in a semiconductor memory. The typical distances calculated in the first and second embodiments are replaced with the damage indexes, thereby allowing it to obtain the combination of the semiconductor memories 4 by solving the optimization problem.

Figure 9:
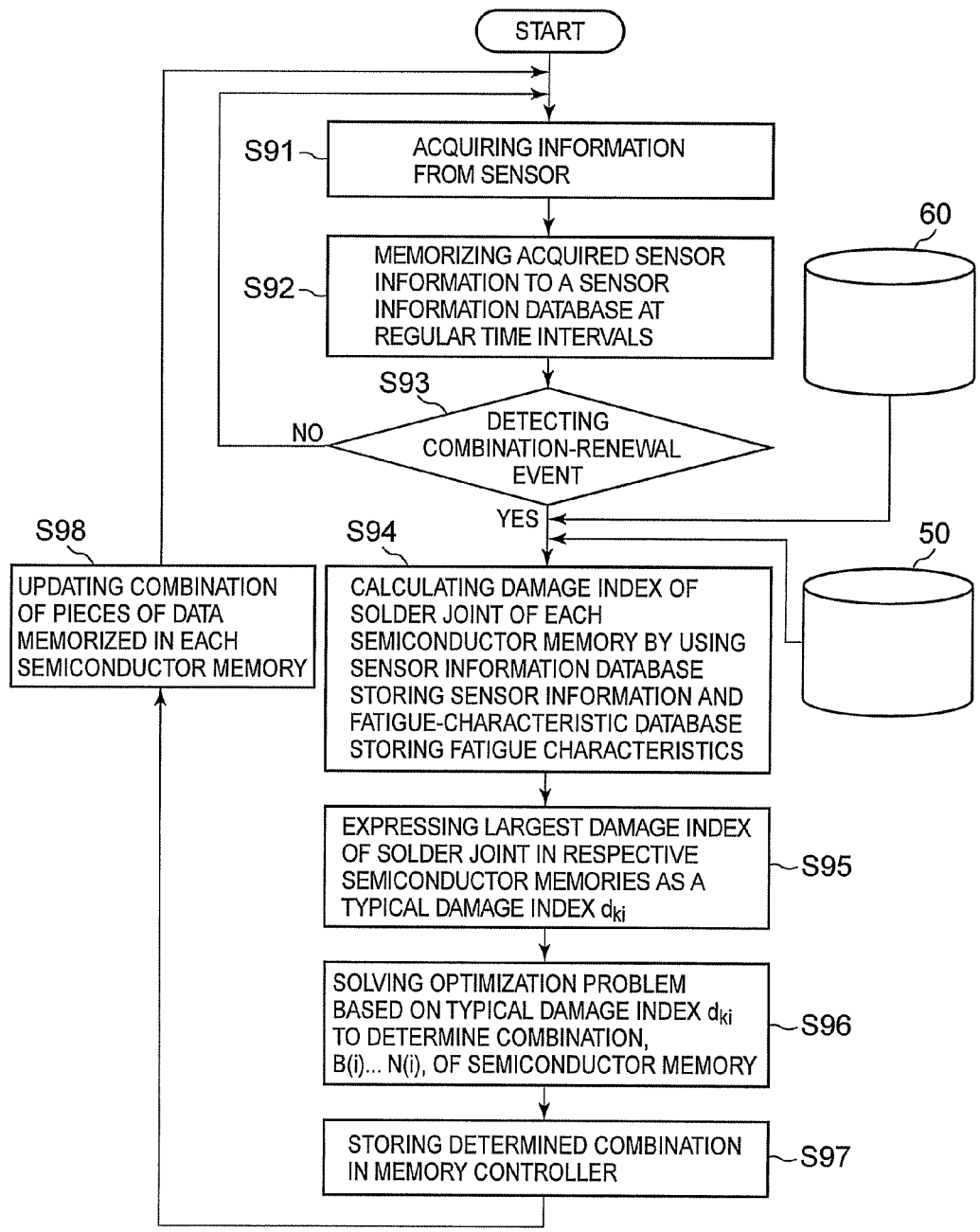
FIG. 9 is a flow chart showing a process to determine a combination of semiconductor memories.

FIG. 9 is a flow chart showing a process to flow until a combination of the semiconductor memories 4 is determined in the third embodiment.

First, information is acquired from the sensor 7 (Step S91). The acquired sensor information is memorized to a sensor information database 60 at regular time intervals (Step S92). A combination-update event is detected in order to judge whether or not the combination of the semiconductor memories 4 is needed to be renewed (Step S93). If the combination-update event is not detected, the process goes back to Step S91. If the combination-update event is detected, the process calculates the damage index of the solder joint 9 of each semiconductor memory 4 by the use of the sensor information database 60 storing sensor information and the fatigue-characteristic database 50 storing fatigue characteristics (Step S94). Subsequently, the largest damage index of the solder joint 9 in the respective semiconductor memories 4 is expressed as a typical damage index $d_{ki}$ (Step S95). The optimization problem is solved on the basis of the typical damage index $d_{ki}$ to determine the combination, B(i)...N(i), of the semiconductor memories 4 (Step S96). The determined combination of the semiconductor memories 4 is stored in the memory controller 30 provided to the RAID system (Step S97). Then, the process updates the combination of the pieces of data memorized in each semiconductor memory 4 (Step S98), and goes back to Step S91.

Fourth Embodiment

Figure 10:
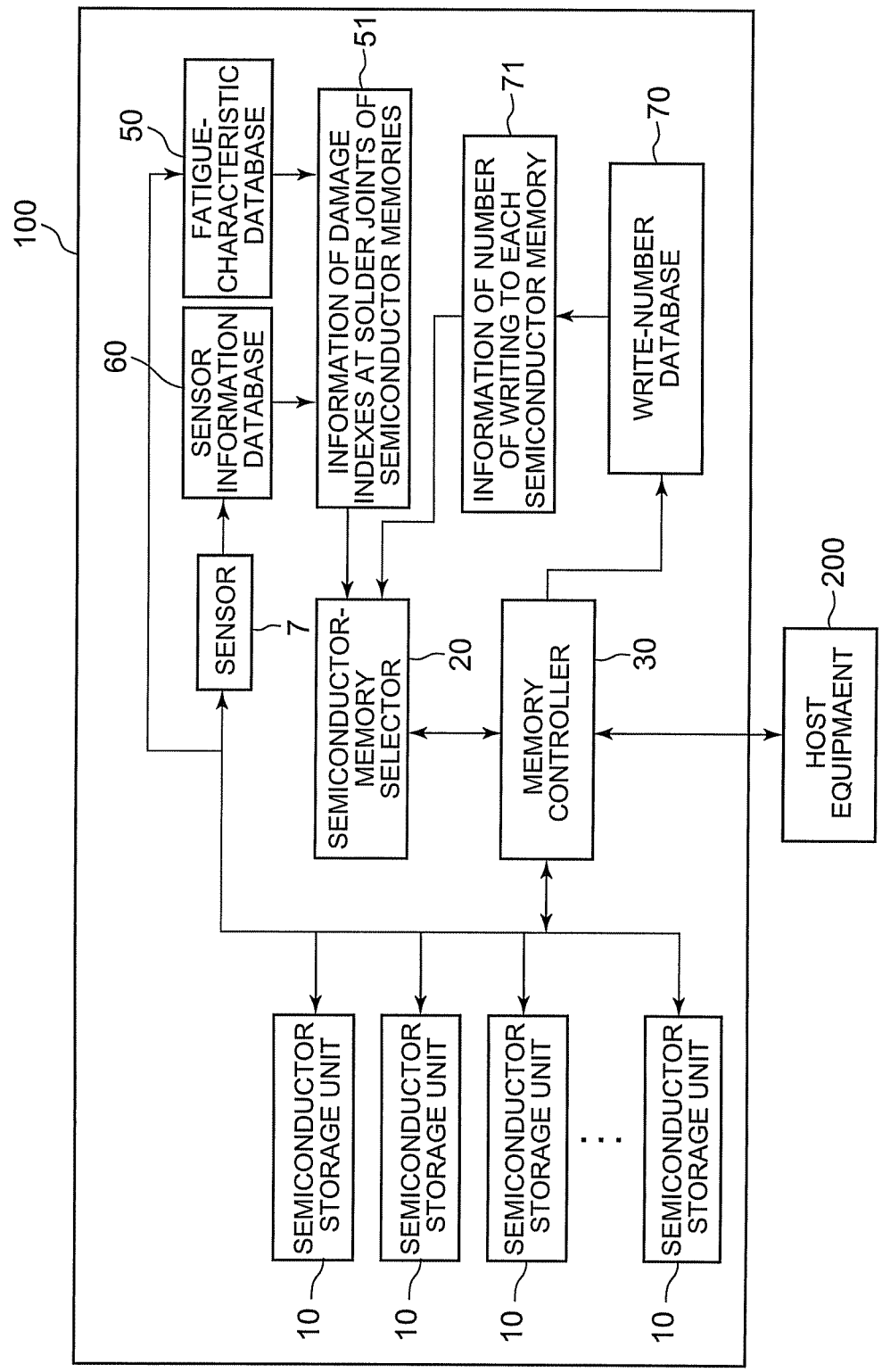
FIG. 10 is a block diagram showing a configuration of a RAID system using semiconductor storage units in accordance with a fourth embodiment.

A fourth embodiment will be described. FIG. 10 is a block diagram showing a configuration of a RAID system 100 using semiconductor storage units in accordance with the fourth embodiment. This RAID system 100 includes two or more semiconductor storage units 10, a memory controller 30, and semiconductor memory selector 20 to be connected to external host equipment 200. Furthermore, the fourth embodiment prepares a fatigue-characteristic database 50 and a write-number database 70 storing information 71 of the number of writing to each semiconductor memory 4. Generally, the number of writing operations in a NAND memory cell is limited in the semiconductor memory 4. The storage cell deteriorates in about millions of writing operations so that the writing operations become impossible. On the other hand, information is written or erased in blocks. Here, a block is a collectivity of memory cells. The number of writing operations to a certain block is recorded separately to be referenced for the next block to which information is to be written. This allows it to deconcentrate the number of writing operations and to prevent concentration of writing to a specific block.

This embodiment refers to the information of degraded storage cells included in each semiconductor memory 4, thereby determining the combination of the semiconductor memories 4 by using the total number of writing operations to each semiconductor memory 4 and the mechanical damage index thereof. For example, in the k-th semiconductor storage unit 10, the optimization problem as shown in the following formulae (2) is solved to determine the combination of the semiconductor memories 4, provided that the total number of writing operations to the i-th semiconductor memory 4 is $D_{ki}$.

[Equation 2]

$$\min \cdot f = \sum_{i=1}^{8} ((d_{1i} + d_{2B(i)} + d_{3C(i)} + \ldots + d_{nN(i)})/n - m)^2 + \alpha g(D_{ki}) \quad (2)$$

$$m = \sum_{i=1}^{8} (d_{1i} + d_{2B(i)} + d_{3C(i)} + \ldots + d_{nN(i)})/(8 \times n)$$

A positive constant is expressd with α. The mechanical damage and the degradation of storage cells due to writing can be balanced, depending on how to determine the function $g(D_{ki})$ and the constant α. As shown in the following formulas (3), the function aiming at averaging the number of writing operations to each storage cell can be chosen as well as that aiming at the mechanical damage.

[Equation 3]

$$g = \sum_{i=1}^{8} ((D_{1i} + D_{2B(i)} + D_{3C(i)} + \ldots + D_{nN(i)})/n - M)^2 \quad (3)$$

$$M = \sum_{i=1}^{8} (D_{1i} + D_{2B(i)} + D_{3C(i)} + \ldots + D_{nN(i)})/(8 \times n)$$

Figure 11:
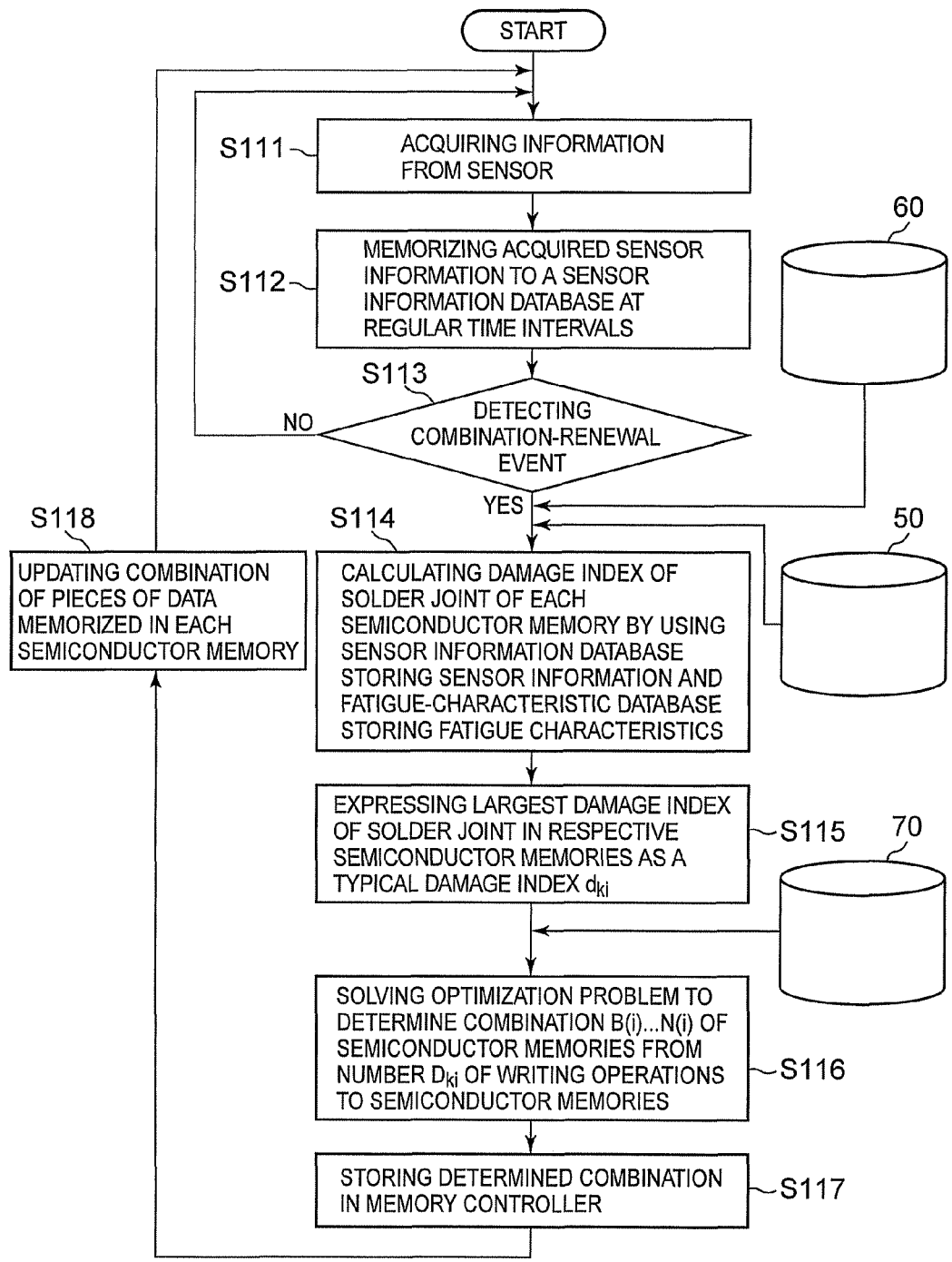
FIG. 11 is a flow chart showing a process to determine a combination of semiconductor memories.

FIG. 11 is a flow chart explaining a process to flow until the combination of the semiconductor memories 4 is determined in the fourth embodiment.

First, information is acquired from the sensor 7 (Step S111). The acquired sensor information is memorized to a sensor information database 60 at regular time intervals (Step S112). A combination-update event is detected in order to judge whether or not the combination of the semiconductor memories 4 is needed to be renewed (Step S113). If the combination-update event is not detected, the process goes back to Step S111. If the combination-update event is detected, the process calculates the damage index of the solder joint 9 of each semiconductor memory 4 by the use of the sensor information database 60 storing sensor information and the fatigue-characteristic database 50 storing fatigue characteristics (Step S114). Subsequently, the largest damage index of the solder joint 9 in the respective semiconductor memories 4 is expressed as a typical damage index $d_{ki}$ (Step S115). The determination of the typical distance $d_{ki}$ is followed by solving the optimization problem to determine the combination B(i) . . . N(i) of the semiconductor memories 4 from the number Dki of writing operations to the semiconductor memories. The number Dki is stored in the write-number database 70 (Step S116). The combination of the determined semiconductor memories is stored in the memory controller 30 provided to the RAID system 100 (Step S117). Then, the process updates the combination of the pieces of data memorized in each semiconductor memory 4 (Step S118), and goes back to Step S111.

According to this embodiment, the RAID system 100 including the arrays of the semiconductor storage units enables it to reduce the risk of data loss caused by mechanical breaks due to saving data to a specific combination of the semiconductor memories.

In addition, the present invention is not limited to the above-mentioned embodiments, and the elements of the embodiments can be modified within a scope thereof for the reduction to practice. Moreover, various inventions can be invented with a proper combination of two or more elements disclosed in the above-mentioned embodiments. For example, some elements can be removed from all the elements shown in the embodiments. Furthermore, the elements can be suitably combined over the different embodiments.

While a certain embodiment of the invention has been described, the embodiment has been presented by way of examples only, and is not intended to limit the scope of the inventions. Indeed, the novel elements and apparatuses described herein may be embodied in a variety of other forms; furthermore, various omissions, substitutions and changes in the form of the methods described herein may be made without departing from the spirit of the invention. The accompanying claims and their equivalents are intended to cover such forms or modifications as would fall within the scope and spirit of the invention.

What is claimed is:

1. A RAID system to transfer data to and from host equipment, comprising:
a semiconductor storage unit including two or more semiconductor memories, a mounting board, and solder joints, the semiconductor memories being mounted on the mounting board, the solder joints being between the semiconductor memories and the mounting board;
a semiconductor-memory selector to select a combination of the semiconductor memories to dispersively record the data in the semiconductor storage unit; and
a memory controller to access the combination in response to a request of the host equipment,
wherein the selector selects the combination based on a calculated average of mechanical loads received by the semiconductor memories.

2. The system according to claim 1, wherein
the mechanical loads are estimated on the basis of a distance between each semiconductor memory on the mounting board and a heat source thereon.

3. The system according to claim 2, wherein
the distance is a shortest distance of all distances between the solder joints and the heat source.

4. The system according to claim 2, wherein
the distance is a shortest distance of all distances between centers of the semiconductor memories and the heat source.

5. The system according to claim 1, wherein
the mechanical loads are estimated on the basis of a distance between each semiconductor memory and a supporting portion to support the mounting board.

6. The system according to claim 5, wherein
the distance is a shortest distance of all distances between solder joints and the supporting portion.

7. The system according to claim 5, wherein
the distance is a shortest distance of all distances between centers of the semiconductor memories and the supporting portion.

8. A RAID system to transfer data to and from host equipment, comprising:
a semiconductor storage unit including two or more semiconductor memories, a mounting board, and solder joints, the semiconductor memories being mounted on the mounting board, the solder joints being between the semiconductor memories and the mounting board;
a semiconductor-memory selector to select a combination of the semiconductor memories to dispersively record the data in the semiconductor storage unit; and
a memory controller to access the combination in response to a request of the host equipment,
wherein the selector selects the combination based on a calculated average of damage indexes of the solder joints.

9. The system according to claim 8, further comprising:
a sensor to measure physical variations in ambient environments on the mounting board or of the mounting board; and
a fatigue-characteristic database having fatigue characteristics of the solder joints,
wherein
the damage indexes of the solder joints are calculated on the basis of information from the sensor and the fatigue characteristics.

10. The system according to claim 9, wherein
the sensor measures at least one physical quantity selected from the group consisting of acceleration, strain, temperature, resistance, and impedance.

11. A RAID system to transfer data to and from host equipment, comprising:
a semiconductor storage unit to include two or more semiconductor memories, a mounting board, and solder joints, the semiconductor memories being mounted on the mounting board, the solder joints being between the semiconductor memories and the mounting board;
a semiconductor-memory selector to select a combination of the semiconductor memories to dispersively record the data In the semiconductor storage unit; and
a memory controller to access the combination in response to a request of the host equipment,
wherein the selector selects the combination based on calculated average of damage indexes of the solder joints and so that a number of writing operations to the semiconductor memories is averaged.

12. The RAID system to claim 11, further comprising:
a sensor to measure physical variations in ambient environments on the mounting board or thereof; and
a fatigue-characteristic database having fatigue characteristics of the solder joints,
wherein
the damage indexes of the solder joints are calculated on the basis of information from the sensor and the fatigue characteristics.

13. The system according to claim 12, wherein
the sensor measures at least one physical quantity selected from the group consisting of acceleration, strain, temperature, resistance and impedance.

14. The RAID system to claim 11, further comprising a write-number database to accumulate the number of writing to the respective semiconductor memories.

15. The system according to claim 11, wherein
the combination is updated with each saving of a file, each use for a certain period or each garbage collection.

16. A control method of a RAID system using two or more semiconductor storage units having two or more semiconductor memories to transfer data to and from host equipment, comprising:
selecting a combination of the semiconductor memories to dispersively record the data in the semiconductor storage units; and
accessing the combination in response to a request of the host equipment, wherein the selecting is performed based on a calculated average of mechanical loads received by the semiconductor memories.

17. A control method of a RAID system using a semiconductor storage unit having two or more semiconductor memories mounted to a board with solder joints to transfer data to and from host equipment, comprising:
selecting a combination of the semiconductor memories to dispersively record the data in the semiconductor storage unit; and
accessing the combination in response to a request of the host equipment, wherein
the selecting is performed based on a calculated average of damage indexes of the solder joints.

18. A control method of a RAID system using a semiconductor storage unit having two or more semiconductor memories to transfer data to and from host equipment, comprising:
selecting a combination of the semiconductor memories to dispersively record the data in the semiconductor storage unit; and
accessing the combination in response to a request of the host equipment, wherein
the selecting is performed based on a calculated average of damage indexes and so that a number of writing operations to the semiconductor memories is averaged.

* * * * *